United States Patent Office 3,413,289
Patented Nov. 26, 1968

3,413,289
PREPARATION OF ANDROSTADIENE PROPIONIC ACID LACTONE AND INTERMEDIATES THEREOF
George Gal, Summit, and Meyer Sletzinger, North Plainfield, N.J., assignors to Merck & Co., Inc., Rahway, N.J., a corporation of New Jersey
No Drawing. Filed Apr. 21, 1966, Ser. No. 544,077
8 Claims. (Cl. 260—239.57)

ABSTRACT OF THE DISCLOSURE

The invention disclosed herein is generally concerned with the preparation of 3-(4,6-androstadien-17β-ol-3-one-17α-yl)-propionic acid lactone and to intermediate steroids which are useful in the preparation thereof. This lactone is prepared by reacting 3β-hydroxy-5,6-dibromo-20-spiroxane with N-bromosuccinimide, and dehydrobrominating the resulting 5,6- dibromoandrostane compound. 3 - (4,6 - androstadien-17β-ol-3-one-17α-yl)-propionic acid lactone possesses useful therapeutic properties as an aldosterone inhibitor. Aldosterone inhibitors block the salt-retaining effects of aldosterone and other salt-retaining steroids and thereby have utility in the treatment of diseases such as congestive heart failure, nephrosis, and cirrhosis of the kidney in which aldosterone secretion is increased.

More particularly this invention relates to 3-(5,6-dibromoandrostane-17β-ol-3-one-17α-yl)-propionic acid lactone and a method for the preparation thereof and to a method for the preparation of 3-(4,6-androstadien-17β-ol-3-one-17α-yl)-propionic acid lactone.

The starting material for the preparation of the novel intermediate steroid compounds of this invention is 3β-hydroxy-5,6-dibromo-20-spiroxane. The starting compound may be conveniently prepared by a series of reaction steps starting with a first step of reacting dehydroepiandrosterone tetrahydropyranyl ether with 3-lithiopropanyl-1,2'-tetrahydropyranyl ether to provide 17α-(3'-hydroxypropyl)-5-androstene-3β,17β - diol di-tetrahydropyranyl ether. This reaction is accomplished by adding an ether solution of 3-lithiopropanyl-1,2'-tetrahydropyranyl ether to a solution of dehydroepiandrosterone tetrahydropyranyl ether in an anhydrous organic solvent, preferably tetrahydrofuran, the temperature of the reaction mixture being kept below about 30° C. during the addition. After addition is complete, the reaction mixture is allowed to stand at room temperature for about 15 hours. The reaction mixture is then added to water, and the reaction product is removed by extraction with a suitable organic solvent, such as ether. The ether extract is washed with water, dried, and the solvent is removed by distillation under reduced pressure. The residue is 17α-(3'-hydroxypropyl) - 5 - androstene-3β,17β-diol di-tetrahydropyranyl ether. The latter compound is converted in the second step to 17β-(3'-hydroxypropyl)-5-androstene-3β,17β-diol without purification by allowing a solution thereof in a suitable solvent, such as ethanol, containing catalytical amount of strong acid, preferably p-toluenesulfonic acid to stand at room temperature for several hours. 17α-(3'-hydroxypropyl)-5-androstene-3β,17β-diol precipitates from the reaction mixture on standing and is filtered off, washed with a suitable solvent, such as ethanol, and dried under reduced pressure. In the third step, 17α-(3'-hydroxypropyl)-5-androstene-3β,17β-diol is treated in pyridine solution with an acid chloride of an aromatic or aliphatic sulfonic acid, such as p-toluenesulfonyl chloride or methanesulfonylchloride, to provide a 3β-aromatic sulfonyloxy-20-spirox-5-ene or a 3β-aliphatic sulfonyloxy-20-spirox-5-ene, such as 3β-p-toluenesulfonyloxy-20-spirox-5-ene or 3β-mesyloxy-20-spirox-5-ene. The latter compound is converted in the fourth step to 3β-hydroxy-20-spirox-5-ene. The third step reaction may be conveniently accomplished by adding the aromatic or aliphatic sulfonyl chloride dropwise to a slurry of 17α-(3'-hydroxypropyl)-5-androstene-3β,17β-diol in anhydrous pyridine. During the addition the reaction mixture is maintained at a temperature of about −10° C., and the acid chloride is added over a period of from about 20 to 30 minutes. After addition is complete, the mixture is stirred for about 3 hours at a temperature in the range from about −10° C. to 0° C. and then allowed to stand overnight at room temperature. The reaction product is isolated by pouring the reaction mixture into ice water and removing the precipitated product by extraction with a siutable solvent, such as ethyl acetate. The extract is washed with cold dilute hydrochloric acid until it is free from pyridine, and the solvent is removed from the resulting solution by distillation under reduced pressure. The residue is crude 3β-aromatic sulfonyloxy-20-spirox-5-ene or 3β-aliphatic sulfonyloxy-20-spirox-5-ene and may be used without purification in the fourth step to produce 3β-hydroxy-20-spirox-5-ene. This is conveniently accomplished by dissolving the crude material in aqueous acetone, preferably in a 4.5–1 acetone-water solvent mixture and heating the resulting solution under reflux for several hours. The reaction product may be isolated by removing the acetone by distillation under reduced pressure and simultaneously adding water to maintain a constant volume. 3β-hydroxy-20-spirox-5-ene precipitates as acetone is removed. After all of the acetone is removed, the resulting slurry is cooled to about 10° C. and the solid material is removed by filtration and dried under reduced pressure. The crude 3β-hydroxy-20-spirox-5-ene may be purified by suspending in a suitable organic solvent, such as normal-hexane, and stirring the resutling slurry at a temperature of about 60° C. for several hours, cooling the mixture to room temperature, filtering, washing the solid material with a suitable solvent, such as normal-hexane, and drying the solid material under reduced pressure. In the fifth step, 3β-hydroxy-20-spirox-5-ene is brominated to provide 3β-hydroxy-5,6-dibromo-20-spiroxane. Bromination is conveniently accomplished by adding a solution of bromine in a halogenated hydro carbon solvent, preferably solution of 3β-hydroxy-20-spirox-5-ene in the same solvent, the solution being cooled and kept under nitrogen during the addition. After addition is complete, the solution is allowed to stand for about 15 minutes at about 5° C. and then concentrated by removing the solvent under reduced pressure. The residual syrup is dissolved in acetone and upon cooling the acetone solution and allowing it to stand, crystalline 3β-hydroxy-5,6-dibromo-20-spiroxane precipitates. The precipitate is removed by filtration, washed with cold water, and dried under reduced pressure.

3β-hydroxy-5,6-dibromo-20-spiroxane is used as the starting compound in the preparation of 3-(4,6-androstadien-17β-ol-3-one-17α-yl)-propionic acid lactone by a process which comprises a first step of oxidation to provide 3-(5,6-dibromoandrostane-17β-ol-3-one-17α-yl)-propionic acid lactone. Oxidation is accomplished by use of N-bromosuccinimide as an oxidizing agent. N-bromosuccinimide is added to a solution of 3β-hydroxy-5,6-dibromo-20-spiroxane in an inert organic solvent, preferably a solvent mixture composed of an aliphatic alcohol such as tertiary butanol, water, and pyridine. The reaction mixture is stirred at room temperature for about 25 hours and then poured into cold water. The reaction product precipitates and is removed by extraction with a suitable organic solvent, such as methylenechloride. The extract is washed with water and dried over anhydrous magnesium sulfate. The reaction product, 3-(5,6-dibromo-androstane-17β-ol-3-one-17α-yl)-propionic acid lactone, is present in the methylenechloride solution.

3-(4,6-androstadien-17β-ol-3-one-17α-yl)-propionic acid lactone is prepared in the second step of the process by dehydrobromination of the 3-(5,6-dibromoandrostane-17β-ol-3-one-17α-yl)-propionic acid lactone. Dehydrobromination is conveniently accomplished by treating the latter compound with lithium carbonate, lithium bromide and anhydrous dimethylformamide. The lithium carbonate, lithium bromide and anhydrous dimethylformamide are added to the solution of 3-(5,6-dibromoandrostane-17β-ol-3-one-17α-yl)-propionic acid lactone obtained from the first reaction step. After the reagents have been added, the solvent is removed by distillation under reduced pressure and the residual reaction mixture is heated under nitrogen for about 18 hours at a temperature of from about 90° to 95° C. After the heating period, the reaction mixture is cooled to room temperature and poured into water. The reaction product is conveniently isolated by extraction with a suitable solvent, such as ether, drying the extract over anhydrous magnesium sulfate, filtering, and removing the solvent by distillation under reduced pressure. The residue is crude 3-(4,6-androstadien-17β-ol-3-one-17α-yl)-propionic acid lactone. The crude product may be purified by chromatography. Silica gel may be used in the chromatographic procedure. A benzene solution of the crude product is put on a column of silica gel and the purified product is recovered by elution of the column with a suitable organic solvent, such as benzene containing about 1% by volume of ethyl acetate.

PREPARATION 1.—17α-(3'-HYDROXYPROPYL)-5-ANDROSTENE-3β,17β-DIOL 8.9 grams of 3-chloropropanol-1,2'-tetrahydropyranyl ether is added over a period of 2 hours to a slurry comprising 0.8 gram of finely divided lithium in 40 ml. of anhydrous ether. The temperature of the reaction mixture is kept under an argon atmosphere and maintained at −5° to −10° C. during the addition. The reaction mixture is filtered in an argon atmosphere to remove traces of unreacted lithium and lithium chloride. The clear filtrate is an ether solution of 3-lithiopropanol-1,2'-tetrahydropyranyl ether and is added to a solution of 10.5 grams of dehydroepiandrosterone tetrahydropyranyl ether in solution in 110 ml. of anhydrous tetrahydrofuran over a period of 30 minutes, during which time the temperature of the reaction mixture is kept below 30° C. The reaction mixture is allowed to stand for 15 hours at room temperature after addition is complete and is then cautiously added to 500 ml. of cold water. This mixture is extracted three times with ether and the combined ether extracts are washed with water and dried over anhydrous magnesium sulfate. The solvent is removed from the dried extracts by distillation under reduced pressure. The oily residue is 17α-(3'-hydroxypropyl)-5-androstene-3β,17β-diol ditetrahydropyranyl ether.

PREPARATION 2

The oily residue from Preparation 1 is dissolved in 100 ml. of ethanol and 0.7 gram of p-toluenesulfonic acid in solution in 10 ml. of ethanol are added to the solution of the oily residue and the resulting solution is stirred at room temperature for 5 hours. The precipitate which forms is removed by filtration, washed with ethanol, and dried under reduced pressure. 5.66 grams of 17α-(3'-hydroxypropyl)-5-androstene-3β,17β-diol are obtained, which has a melting point of 274° to 278° C.

PREPARATION 3.—3β-MESYLOXY-20-SPIROX-5-ENE 10.2 grams of mesylchloride are added dropwise over a period of 20 to 30 minutes to a slurry of 7.5 grams of 17α-(3'-hydroxypropyl)-5-androstene-3β,17β-diol in 75 ml. of anhydrous pyridine. The reaction mixture is kept at a temperature of −10° C. during the addition. After addition is complete, the mixture is stirred for 3 hours and during this period the temperature is kept between −10° C. and 0° C. The mixture is then allowed to come to room temperature and stand at room temperature overnight. After standing overnight, the reaction mixture is poured in 700 ml. of ice water, and the precipitate is removed by extraction with ethyl acetate. The extract is washed with 0.5 N hydrochloric acid until free from pyridine, dried over anhydrous magnesium sulfate, and filtered. The solvent is removed by distillation under reduced pressure. A residue of 8.9 fine grams of crude 3β-mesyloxy-20-spirox-5-ene is obtained, which has a melting point of 132° to 134° C.

PREPARATION 4.—3β-HYDROXY-20-SPIROX-5-ENE

The crude 3β-mesyloxy-20-spirox-5-ene is dissolved in a solvent mixture composed of 180 ml. of acetone and 40 ml. of water. The resulting solution is refluxed for 4 hours and the acetone is then removed by distillation under reduced pressure and replaced simultaneously with water at a rate such that the volume in the distillation flask is maintained at a constant level. The resulting slurry is cooled to 10° C., and the solid material is removed by filtration, washed with water until acid free, and dried under reduced pressure. 7.1 grams of 3β-hydroxy-20-spirox-5-ene are obtained, which has a melting point of 165° to 172° C. The crude 3β-hydroxy-20-spirox-5-ene is suspended in 70 ml. of normal-hexane, and the suspension is stirred for 2 hours at a temperature of 60° C. The suspension is cooled to room temperature, filtered, and the solid material is washed with normal-hexane and dried under reduced pressure. 670 grams of 3β-hydroxy-20-spirox-5-ene are obtained, which has a melting point of 185° to 187° C.

PREPARATION 5—3β-HYDROXY-5, 6-DIBROMO-20-SPIROXANE 9.9 grams of 3β-hydroxy-20-spirox-5-ene are dissolved in 220 ml. of methylenechloride. The solution is cooled to 5° C. under nitrogen and a solution of 4.8 grams of bromine and 25 ml. of methylenechloride is added over a period of 10 minutes. After addition is complete, the solution is allowed to stand at a temperature of 5° C. for 15 minutes and the solvents are then removed by distillation under reduced pressure. The residue is dissolved in 30 ml. of dry acetone and the acetone solution is cooled to 0° C. and allowed to stand at that temperature for 20 minutes. 3β-hydroxy-5, 6-dibromo-20-spiroxane crystallizes from the acetone solution on standing and is removed by filteration, washed with cold acetone, and dried under reduced pressure. 12.5 grams of 3β-hydroxy-5, 6-dibromo-20-spiroxane, having a melting point of 124° to 125° C., are obtained.

The following examples illustrate methods of carrying out the present invention, but it is to be understood that these examples are givne for purposes of illustration and not of limitation.

Example 1

3-(5,6-DIBROMOANDROSTANE-17β-OL-3-ONE-17α-YL)-PROPIONIC ACID LACTONE 2.2 grams of N-bromosuccinimide are added to a solution of 1 gram of 3β-hydroxy-5, 6-dibromo-20-spiroxane in a solvent mixture composed of 20 ml. of tertiary butanol, 1.2 ml. of water, and 1.2 ml. of pyridine. The reaction mixture is stirred for 25 hours at room temperature and then poured into 100 ml. of cold water. The precipitated product is removed by extraction with methylenechloride, the extract is washed with water and dried over anhydrous magnesium sulfate.

Example 2

3-(4,6-ANDROSTADIEN-17β-OL-3-ONE-17α-YL)-PROPIONIC ACID LACTONE 0.6 gram of lithium carbonate, 0.55 gram of lithium bromide, and 6 ml. of anhydrous dimethylformamide are added to the methylenechloride solution of 3-(5,6-dibromoandrostane-17β-ol-3-one-17α-yl)-propionic acid lactone obtained from Example I. The methylenechloride is removered from the extraction mixture by distillation under reduced pressure, and the residual reaction mixture is heated under nitrogen for 18 hours at 90° to 95° C. After the heating period, the reaction mixture is cooled to room temperature and poured into 100 ml. of water. The precipitated product is removed by extraction with ether, and the ether extract is dried over anhydrous magnesium sulfate, and filtered. The ether is removed by distillation under reduced pressure. The residue of crude 3-(4,6-androstadien-17β-ol-3-one-17α-yl)proprionic acid lactone is dissolved in 50 ml. of benzene. The benezene solution is poured onto a silica gel column. 3-(4,6-androstadien-17β-ol-3-one-17α-yl)-propionic acid lactone is removed from the column by elution with benezen containing 1% by volume of ethyl acetate and the solvent is removed from the eluate by distillation under reduced pressure. The purified product has a melting point of 148° to 150° C.

Various changes and modifications may be made in carrying out the present invention without departing from the spirit and scope thereof. Insofar as these changes and modifications are within the purview of the annexed claims, they are to be considered as part of our invention.

What is claimed is:

1. A process for the preparation of 3-(4,6-androstadien-17β-ol-3-one-17α-yl)-propionic acid lactone which comprises the steps of oxidizing 3β-hydroxy-5, 6-dibromo-20-spiroxane in solution in an inert organic solvent with N-bromosuccinimide to provide 3-(5,6-dibromoandrostane-17β-ol-3-one-17α-yl)-propionic acid lactone and dehydrobrominating the latter compound by adding lithium carbonate and lithium bromide in dimethylformamide solution to a solution thereof in an inert organic solvent, removing the solvent by distillation and heating the resulting mixture.

2. A process according to claim 1 in which in the oxidation step the inert organic solvent is a mixture of an aliphatic alcohol, water and pyridine.

3. A process according to claim 1 in which the dehydrobromination step is accomplished by heating the reaction mixture containing 3-(5,6-dibromoandrostane-17β-ol-3-one-17α-yl)-propionic acid lactone, lithium carbonate, lithium bromide and dimethylformamide under nitrogen for about 18 hours at a temperature of from 90° to 95° C., after the solvent has been removed.

4. A process for the preparation of 3-(5,6-dibromanrotane-17β-ol-3-one-17α-yl)-propionic acid lactone which comprises dehaydrobrominating 3-(5,6-dibromoandrosane in solution in an inert organic solvent with N-bromosuccinimide.

5. A process according to claim 4 in which the inert organic solvent is a mixture of an aliphatic alcohol, water and pyridine.

6. A process for the preparation of 3-(4,6-androstadien-17β-ol-3-one-17α-yl)-propionic acid lactone which comprises dehydrobrominating 3-(5,6 - dibromoandrostane-17β-ol-3-one-17α-yl)-propionic acid lactone by adding lithium carbonate and lithium bromide in dimethylformamide suspension to a solution thereof in an inert organic solvent, removing the solvent by distillation and heating the resulting mixture.

7. A process according to claim 6 in which the reaction mixture which remains after the solvent is removed by distillation is heated under nitrogen for about 18 hours at a temperature of from about 90° to 95° C.

8. 3-(5,6-dibromoandrostane-17β-ol-3-one - 17α - yl)-propionic acid lactone.

References Cited

UNITED STATES PATENTS

| | | | |
|---|---|---|---|
| 2,900,383 | 8/1959 | Cella | 260—239.57 |
| 3,074,936 | 1/1963 | Zderic et al. | 260—239.57 |
| 3,280,116 | 10/1966 | Webber | 260—239.57 |

LEWIS GOTTS, *Primary Examiner.*

E. LOVE, *Assistant Examiner.*